United States Patent
Lin et al.

(10) Patent No.: US 10,701,779 B2
(45) Date of Patent: Jun. 30, 2020

(54) DRIVE DEVICE FOR ILLUMINATING DEVICE, ILLUMINATION DEVICE, LIGHTING SYSTEM AND METHOD FOR CONTROLLING THE LIGHTING SYSTEM

(71) Applicant: LEDVANCE GmbH, Garching (DE)

(72) Inventors: Daxin Lin, Guangdong (CN); Xusheng Yang, Guangdong (CN)

(73) Assignee: LEDVANCE GMBH, Garching bei München (DE)

(*) Notice: Subject to any disclaimer, the term of this patent is extended or adjusted under 35 U.S.C. 154(b) by 13 days.

(21) Appl. No.: 15/543,047

(22) PCT Filed: Dec. 17, 2015

(86) PCT No.: PCT/EP2015/080291
§ 371 (c)(1),
(2) Date: Jul. 12, 2017

(87) PCT Pub. No.: WO2016/113068
PCT Pub. Date: Jul. 21, 2016

(65) Prior Publication Data
US 2018/0007752 A1    Jan. 4, 2018

(30) Foreign Application Priority Data
Jan. 13, 2015  (CN) .......................... 2015 1 0017660

(51) Int. Cl.
| H05B 33/08 | (2006.01) |
| H05B 45/37 | (2020.01) |
| H05B 45/00 | (2020.01) |
| H05B 45/50 | (2020.01) |

(52) U.S. Cl.
CPC ............ *H05B 45/37* (2020.01); *H05B 45/00* (2020.01); *H05B 45/50* (2020.01); *Y02B 20/383* (2013.01)

(58) Field of Classification Search
None
See application file for complete search history.

(56) References Cited

U.S. PATENT DOCUMENTS

| 6,011,362 A * | 1/2000 | Moisin ................. H05B 41/295 315/225 |
| 9,101,010 B2 * | 8/2015 | Melanson .......... H05B 33/0806 |
| 2007/0159212 A1 * | 7/2007 | Price ................. H02M 7/53806 326/120 |

(Continued)

FOREIGN PATENT DOCUMENTS

| EP | 2608638 A1 | 6/2013 |
| EP | 2658347 A1 | 10/2013 |

*Primary Examiner* — Crystal L Hammond
(74) *Attorney, Agent, or Firm* — Hayes Soloway PC

(57) ABSTRACT

The present invention relates to a drive device for an illuminating load, an illumination device, a lighting system and a method for controlling the lighting system, wherein the drive device is connected between the illuminating load and a power adapter device for power supply, wherein the drive device comprises a control unit, wherein the control unit is configured to adjust the impedance of the drive device according to an electric output signal measured from the illuminating load so as to accordingly adjust the output voltage of the power adapter device and thereby to adjust the electric output signal for the illuminating load.

20 Claims, 2 Drawing Sheets

(56) References Cited

U.S. PATENT DOCUMENTS

| | | | |
|---|---|---|---|
| 2010/0148683 A1* | 6/2010 | Zimmermann | H05B 33/0818 315/224 |
| 2011/0080110 A1* | 4/2011 | Nuhfer | H05B 33/0815 315/291 |
| 2011/0309760 A1* | 12/2011 | Beland | H05B 45/37 315/201 |
| 2014/0306615 A1* | 10/2014 | Choi | H05B 33/0815 315/201 |
| 2015/0181661 A1* | 6/2015 | Hsia | F21V 25/04 315/160 |
| 2016/0088695 A1* | 3/2016 | Cao | H05B 33/089 315/192 |

* cited by examiner

DRIVE DEVICE FOR ILLUMINATING DEVICE, ILLUMINATION DEVICE, LIGHTING SYSTEM AND METHOD FOR CONTROLLING THE LIGHTING SYSTEM

TECHNICAL FIELD

The present invention relates to a drive device for an illumination device, an illumination device, a lighting system and a method for controlling the lighting system, wherein the illumination device particularly comprises a LED illuminating load and is adapted to use an ECG electronic ballast as further part of said lighting system.

BACKGROUND ART

In the current illuminating devices in common use, the LED illuminating devices are widely used due to their performances of energy saving and high efficiency to replace the illuminating devices such as filament lamps or fluorescent lamps. For example, as the LED technology is widely used, the light source of most of the T8 luminaires is changed to the LED light source using the LED technology, and the suitable LED driver is correspondingly used, such that the fluorescent light source is removed while the tube sockets of the T8 lamp are retained in the respective luminaire. In this way, the manufactured light source has the appearance of the T8 lamp, while it is equipped internally with the light source having the LED performances. In the above improvement on the T8 lamp, the ECG electronic ballast for driving the fluorescent lamp may not be removed from the luminaire because the latter one remains installed, and thus furthermore the ECG type keeps hidden, but some ECGs dedicated to the fluorescent light source often are not applicable to the LED light source because of the problem that the LED light source usually may not be compatible with different ECG types.

SUMMARY OF THE INVENTION

In order to solve the above-mentioned technical problems, the present invention provides a novel drive device for LED lamp. This drive device, especially in a single stage, boost topology circuit structure, can be well adapted to the ECG electronic ballast such that the LED light source can be operated normally when installed in the conventional but ECG electronically ballasted luminaire for the fluorescent lamp. All other switch-mode DC/DC converter topology circuit structures comprising only a single switch unit are feasible for building up this drive device as well.

One of the objectives of the present invention is realized via such a drive device for illuminating device that is connected between an illuminating load and a power adapter device for a power supply, wherein the drive device comprises a control unit, wherein the control unit is configured to adjust an impedance of the drive device according to an electric output signal for the illuminating load so as to correspondingly adjust an output voltage of the power adapter device and thereby to adjust the electric output signal for the illuminating load. More generally spoken, the switch-mode DC/DC converter of the drive device acts as a shunt regulator which is connected in parallel to the illuminating load.

Preferably, the drive device further comprises a switch-mode DC/DC converter topology circuit structure including a switch unit, wherein the control unit adjusts the impedance of the drive device by means of adjusting the conduction time of said switch unit.

Preferably, the switch-mode DC/DC converter of the drive device acts as a shunt regulator which is connected in parallel to the illuminating load.

Preferably, the control unit increases the conduction time of the switch unit so as to reduce the electric output signal for the illuminating load, and the control unit decreases the conduction time of the switch unit so as to increase the electric output signal for the illuminating load.

Preferably, the drive device is operated in critical conduction mode.

Preferably, the DC/DC converter including the switch unit is configured as boost circuit.

A further objective is achieved by an illumination device, further comprising a LED illuminating load, characterized in that the illumination device comprises the drive device as described above.

It is also provided in the present invention a lighting system further comprising a power adapter device between power supply and said illumination device, characterized in that the lighting system comprises an illumination device as described above, and wherein the power adapter device is configured as ECG electronic ballast, wherein the ECG electronic ballast follows the impedance of the drive device by varying its output voltage in response to the conduction time of the switch unit.

In the present invention, the control unit of the drive device especially advantageously forms a positive feedback control mode so as to change the output situation of the power adapter device located upstream of the drive device in a situation that an output signal fed back from the illuminating load is sensed, thereby the output signal for the illuminating device subsequently can be stabilized in a predetermined range. Besides, this drive device can correspondingly change the impedance of the drive device particularly according to the properties of the ECG electronic ballast such that the LED load is better adapted to the ECG electronic ballast.

According to the drive device for an illuminating device in the present invention, especially in a situation that an ECG electronic ballast is used, compared with the solution in which the conventional fluorescent lamp is directly replaced with the LED light source, the LED light source can be better compatible with the ECG electronic ballast. Compared with the configuration with two stage topology structure, the configuration of the single stage topology structure in the present invention has improved efficiency. In addition, a lot of costs are saved without quite complex transformation of the conventional fluorescent lamp, for instance, without replacement or transformation of the lamps shape or plug for electrical connection of the illuminating device having this drive device.

According to a preferred solution of the present invention, the control unit is configured to regulate the drive device in such a manner that the power adapter device increases its output voltage when the electric output signal measured from the illuminating load is lower than a predetermined value, and the control unit is configured to regulate the drive device in such a manner that the power adapter device decreases the output voltage when the electric output signal measured from the illuminating load is higher than the predetermined value. The drive device according to the present invention can initiatively sense the electric output signal from the illuminating load, and, when determining whether or not it is within a predetermined range, change the output situation of the power adapter device so as to realize the purpose of stabilizing the electric output signal for the illuminating device.

Preferably, the lighting system comprises an ECG acting as power adapter device which outputs high frequency alternating currents and voltages having RMS values referred to in the following, and which provides a first output current corresponding to a first bigger output voltage and a second output current corresponding to a second smaller output voltage, characterized by that the relation between said second and said first output currents is smaller than the relation between said first and said second output voltages.

According to a further preferred solution of the present invention, the drive device further comprises a switch unit, wherein the control unit adjusts an impedance of the drive device in a way of adjusting conduction time of the switch unit. The drive device according to the present invention advantageously adjusts a duty cycle for conduction time of the switch unit so as to change the impedance of the drive device such that the illuminating load controlled by the drive device can change its output in a situation that the power adapter device changes its output voltage responsive to the change of the impedance.

Advantageously for the solution of the present invention, the control unit of the inventive drive device increases the conduction time of the switch unit so as to reduce the electric output signal for the illuminating load, and the control unit decreases the conduction time of the switch unit so as to enlarge the electric output signal for the illuminating load. This results in said positive feedback control mode. The control compensation preferably provides a proportional or a proportional-integrating characteristic, saying that the feed-back path comprises at least a resistor or a series-connection out of a resistor and a capacitor.

Further preferably, the illuminating device is configured as an LED illuminating device. The LED illuminating device according to the present invention advantageously has ECG electronic ballast as power adapter device and the inventive drive device downstream of said power adapter device.

According to a solution of the present invention, the power adapter device is configured as ECG electronic ballast which outputs high frequency alternating current having a constant RMS value, which is abbreviated as constant current ECG, wherein the ECG electronic ballast is capable of correspondingly adjusting the output voltage responsive to the conduction time of the switch unit.

In the configuration of the present invention, the ECG electronic ballast outputs a constant current electric signal. The ECG electronic ballast has such characteristics that a constant current type ECG has a power changing with the change of the load, besides, in cases where the impedance of the load is increased, the voltage of the illuminating device will be increased so as to have a stable current of the illuminating device. With this, the constant current type ECG provides the more output power the more the impedance of its load increases. In the present invention, the drive device is just advantageously configured such that the impedance of the drive device is changed according to the output of the load in order to change the power of ECG.

More generally, the drive device according to the present invention works properly even if the ECG alias power adapter device isn't acting as ideal current source, showing constant current against any output voltage, but acting as a real current source, characterized by that the relation between a second bigger output current and a first smaller output current is smaller than the relation between the corresponding first bigger output voltage and the corresponding second smaller output voltage. If these two relations would be equal, the considered ECG would have a constant-power output characteristic which is the boundary condition where the drive device according to the present invention will lose its intended functionality. Said drive device adapts the characteristic of said LED illumination device properly to the output characteristic of a power adapter device alias ECG if the considered ECG is a constant current type ECG or has any characteristic between constant current output and constant power output.

Further preferably, the drive device is operated in a critical-conduction mode called "CRM". This operation mode of the drive device can alternatively be named boundary conduction mode ("BCM") or transient conduction mode ("TCM").

Preferably, the switching frequency of the drive device doesn't match to the switching frequency of the ECG acting as power adapter device. Especially, the relation between these two frequencies equals the relation between two twin- or triple-digits prime factors. An even better frequency-relation is any irrational number. More preferable, at least one of these two frequencies is sweeping over time more than pulse-minus 5% of its mean value, or both frequencies are sweeping over time with at least the same frequency variation in a chaotic manner, thus the relation between them is not constant.

Preferably for the solution of the present invention, the drive device is configured as a boost circuit. In a situation that the ECG electronic ballast follows an increase of the impedance of the drive device, the constant current output of the electronic ballast can have an increased voltage output, and the boost circuit therefore can receive more energy, thereby the output power of the boost circuit is increased, and further the current of the LED load is increased. When the LED current is matched and is stable at a certain predetermined value, the output of the boost circuit will be stable at a certain value, and the duty cycle for conduction time of the switch unit also will be stable at a certain value.

Preferably, the switching frequency of the drive device does not match with the switching frequency of the ECG acting as power adapter device.

Preferably, the relation between the switching frequency of the drive device and the switching frequency of the ECG acting as power adapter device comprises the relation between two twin- or triple-digits prime factors.

Preferably, the relation between the switching frequency of the drive device and the switching frequency of the ECG acting as power adapter device comprises an irrational number.

Preferably, the switching frequency of the drive device is sweeping over time more than plus-minus 5% of its mean value.

Preferably, the switching frequency of the ECG acting as power adapter device is sweeping over time more than plus-minus 5% of its mean value.

A further objective of the present invention is achieved by such an illumination device, wherein the illumination device is implemented to comprise the drive device as described above.

In addition, a further objective of the present invention is realized via a method for controlling the lighting system as described above, wherein the method comprises the following steps:

a) a control unit of the drive device detects an electric output signal from the illuminating load;

b) the control unit adjusts conduction time of a switch unit of the drive device according to the electric output signal detected;

c) the control unit adjusts an output voltage of the power adapter device for the power supply responsive to a variation of the conduction time of the switch unit; and d) the output voltage of the power adapter device is adjusted to coincide the predetermined range of the electric output signal measured from the illuminating load.

BRIEF DESCRIPTION OF THE DRAWINGS

The accompanying drawing constitutes a part of the present description and is used to provide further understanding of the present invention. Such accompanying drawing illustrates the embodiment of the present invention and is used to describe the principles of the present invention together with the description. In the accompanying drawing the same components are represented by the same reference numbers. As shown in the drawing.

DETAILED DESCRIPTION OF THE EMBODIMENTS

Figure 1:
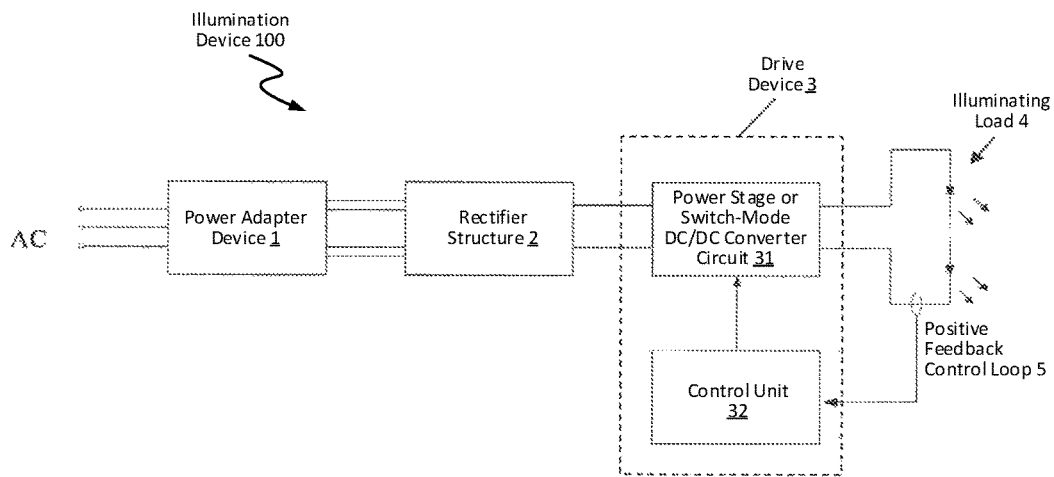
FIG. 1 shows a block diagram of structure of an illuminating device according to the present invention.

As shown in FIG. 1, an illuminating device 100 according to the present invention is configured to comprise an ECG electronic ballast connected and adapted to a power supply, a rectifier structure 2 located downstream of the ECG electronic ballast as a power adapter device 1, a drive device 3 according to the present invention connected downstream of the rectifier structure 2, and a light source supplied by the drive device 3 in a controlled manner. In the present invention, the power supply for the ECG electronic ballast preferably can be an alternating current mains just as shown in the figure. Besides, in the present invention, the ECG electronic ballast is preferably configured to output a constant current electric signal, and the light source according to the present invention is preferably configured as an LED light source.

The drive device 3 according to the present invention is preferably configured to comprise a control unit 32 and a power stage 31 connected to this control unit 32. The power stage 31 may comprise any of the at least six possible switch-mode DC/DC converter topology circuit structures (e. g. Buck, Boost, Buckboost, Flyback, 'Cuk, SEPIC, Zeta, Forward), preferably a boost circuit, and a switch unit, in which unit an electric switch component, e.g. MOSFET, is advantageously included, such that in the present example adjustment of the duty cycle for conduction time of the switch unit just means adjustment of the conduction time of the MOSFET. The control unit 32 can advantageously sense an LED load current of the illuminating device 100 as a feedback signal and correspondingly control and adjust the switch unit according to this feedback signal. In the present invention, the control unit 32 can be advantageously configured as, e.g., a microcontroller MCU, while any other dedicated controller can also be alternatively used here. The control unit 32 can advantageously form a positive feedback control loop 5 between an illuminating load 4 and the switch unit. This means that, in contrary to any PFC or standard DC/DC converting functionality incorporating all well known negative feedback control loops, here the control unit of the inventive drive device increases the conduction time of the switch unit so as to reduce the electric output signal for the illuminating load, and the control unit decreases the conduction time of the switch unit so as to enlarge the electric output signal for the illuminating load.

The control unit 32 adjusts the duty cycle of switching the power stage 31 according to the feedback signal obtained from output of the illuminating load, that is, adjusts a duty cycle so as to control an input impedance of the drive device 3. The power stage according to the present invention is preferably configured with a single stage topology structure, and a work frequency of the power stage is changed by changing its duty cycle, so as to further change the input impedance of the drive circuit. More general, the switching frequency of the power stage 31 is changed by varying the on-time of its switching element, e. g. MOSFET, or the off-time, or both. By that, the control method results in a PWM pulse width modulation.

In the present invention, the PWM control can be activated especially advantageously using zero-crossing detection (ZCD), and is subsequently closed according to the set activation time. The result of this is the critical-conduction mode called "CRM". This operation mode of the drive device can alternatively be named boundary conduction mode ("BCM") or transient conduction mode ("TCM") and is characterized by that the off-time of the switch unit inside the power stage 31 isn't actively controlled, but simply ends at the time event of said ZCD, thus depends on the starting conditions, the energy states, and the values of the power stage's components only.

Preferably, the duty cycle of the power stage can be controlled in a way of PWM pulse width modulation. For better understanding of this control process, an example is listed in the following for illustration: in one time interval, the conduction time is fixed and unchanged for each positive feedback control cycle, while when it arrives at the next feedback control cycle, the control unit 32 will calculate a new conduction time according to the positive feedback control cycle, wherein the conduction time can be preferably set and changed with, for instance, software combined with the positive feedback control loop 5 until the illuminating device 100 has a stable LED output current.

A preferable control process of a lighting system comprising an illumination device having the drive device 3 in the present invention can be especially summarized in exemplification as including the content of the following steps, herein the power stage of the drive device 3 preferably is operated in a critical-conduction mode CRM, the control unit 32 carries out the zero-crossing detection, obtains a fixed conduction time for the switch unit within the power stage, senses an output current of the illuminating load, and adjusts the conduction time, i.e., PWM of the switch unit, using the positive feedback control loop 5. The action of the positive feedback control loop 5 can be understood in that the duty cycle for conduction time is reduced if the LED output current is not enough to reach a predetermined value, and the duty cycle for conduction time is increased if the LED output current exceeds the predetermined value.

1. The drive device 3 will ask for a rated power output, for example 150V/120 mA in the present example;
2. The control unit 32 senses an LED output current, and if the LED current is less than 120 mA, the control unit 32 will reduce the duty cycle for conduction time, and then it will increase the impedance of the drive device 3, thereby the constant current of the ECG electronic ballast will have a higher voltage output, accordingly the power stage 31 likewise will have more energy available such that the output power of the drive device will be increased;

3. The LED output current will be increased when the output power of the drive device is increased;
4. It returns to step 1 until the LED has an enough current (120 mA); and
5. If the LED output current is matched and stable, the output power of the drive device will be stabilized at a certain value, and the duty cycle for conduction time will stay at a stable value.

Figure 2:
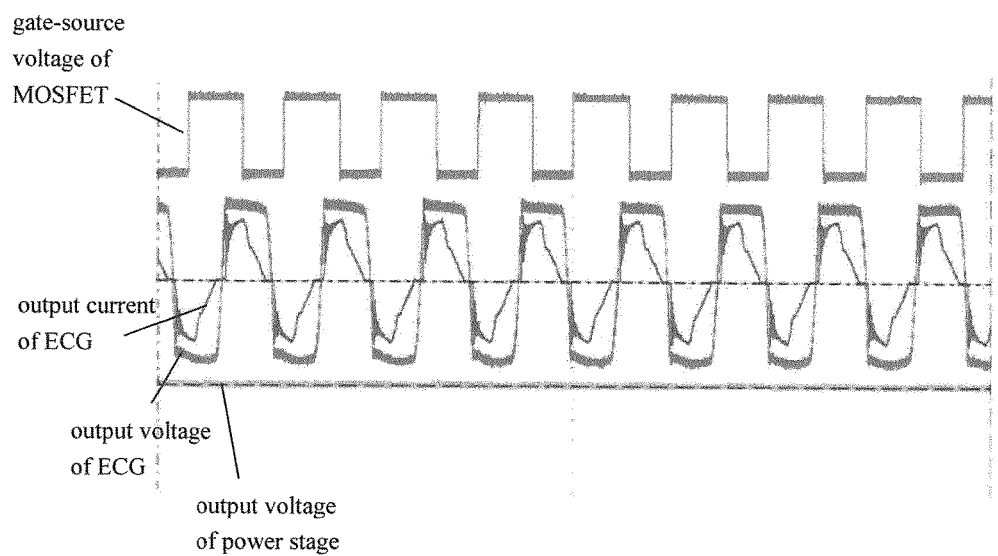
FIG. 2 shows a diagram of output signals of the drive device and ECG electronic ballast.

In addition, as it can be seen from FIG. 2 where it shows a diagram of output signals of the drive device and ECG electronic ballast, a person skilled in the art may derive that, as it is preferably proposed in the present invention, the switching frequency of the inventive drive device does not match with the switching frequency of the ECG serves as the power adapter device.

The above is merely preferred embodiments of the present invention but not to limit the present invention. For the person skilled in the art, the present invention may have various alterations and changes. Any alterations, equivalent substitutions, improvements, within the spirit and principle of the present invention, should be covered in the protection scope of the present invention.

LIST OF REFERENCE SIGNS

1 power adapter device
2 rectifier structure
3 drive device
31 power stage or switch-mode DC/DC converter circuit comprising a switch unit
32 control unit
4 illuminating load
5 positive feedback control loop
100 illumination device

What is claimed is:

1. A drive device for an illumination device, connected between an illuminating load and a power adapter device for a power supply, wherein the drive device comprises a control unit, characterized in that the control unit is configured to adjust the impedance of the drive device according to the electric output signal measured from the illuminating load so as to adjust accordingly the output voltage of the power adapter device and thereby to adjust the electric output signal for the illuminating load.

2. The drive device according to claim 1, characterized in that the drive device further comprises a switch-mode DC/DC converter including a switch unit, wherein the control unit adjusts the impedance of the drive device by means of adjusting the conduction time of said switch unit.

3. The drive device according to claim 2, characterized in that said switch-mode DC/DC converter of the drive device acts as a shunt regulator which is connected in parallel to the illuminating load.

4. The drive device according to claim 3, characterized in that the control unit increases the conduction time of the switch unit so as to reduce the electric output signal for the illuminating load, and the control unit decreases the conduction time of the switch unit so as to increase the electric output signal for the illuminating load.

5. The drive device of claim 2, characterized in that the switch-mode DC/DC converter including the switch unit is configured as boost circuit.

6. The drive device according to claim 1, characterized in that the drive device is operated in critical conduction mode.

7. An illumination device, further comprising a LED illuminating load, characterized in that the illumination device comprises the drive device as claimed in claim 1.

8. A lighting system further comprising a power adapter device between power supply and said illumination device, characterized in that the lighting system comprises an illumination device claimed in claim 7, and characterized in that the power adapter device is configured as ECG electronic ballast, wherein the ECG electronic ballast follows the impedance of the drive device by varying its output voltage in response to the conduction time of the switch unit.

9. The lighting system according to claim 8, characterized in that the control unit is configured such that the power adapter device increases the output voltage when the electric output signal measured from the illuminating load is lower than a predetermined value, and the control unit is configured such that the power adapter device decreases the output voltage when the electric output signal measured from the illuminating load is higher than the predetermined value.

10. The lighting system according to claim 9, comprising an ECG acting as power adapter device which outputs high frequency alternating currents and voltages having constant RMS values, and which provides a first output current corresponding to a first output voltage and a second output current corresponding to a second output voltage smaller the first output voltage, characterized by that the relation between said second and said first output currents is smaller than the relation between said first and said second output voltages.

11. The lighting system according to claim 10 characterized in that the switching frequency of the drive device does not match with the switching frequency of the ECG acting as power adapter device.

12. The lighting system according to claim 11, characterized in that the relation between the switching frequency of the drive device and the switching frequency of the ECG acting as power adapter device comprises the relation between two twin- or triple-digits prime factors.

13. The lighting system according to claim 11, characterized in that the relation between the switching frequency of the drive device and the switching frequency of the ECG acting as power adapter device comprises an irrational number.

14. The lighting system according to claim 11, characterized in that the switching frequency of the drive device is sweeping over time more than plus-minus 5% of its mean value.

15. The lighting system according to claim 11, characterized in that the switching frequency of the ECG acting as power adapter device is sweeping over time more than plus-minus 5% of its mean value.

16. The lighting system according to claim 9, characterized in that the ECG electronic ballast outputs a high frequency alternating current electric signal having a constant RMS current value.

17. A method for controlling the lighting system according to claim 8, characterized in that:
   a control unit of the drive device detects an electric output signal from the illuminating load;
   the control unit adjusts conduction time of a switch unit of the drive device according to the electric output signal detected;
   the control unit adjusts an output voltage of the power adapter device for the power supply responsive to a variation of the conduction time of the switch unit; and the output voltage of the power adapter device is adjusted to coincide the predetermined range of the electric output signal measured from the illuminating load.

18. The drive device according to claim 1, wherein the power adapter device for a power supply is configured as an ECG electronic ballast.

19. The drive device according to claim 18, wherein the drive device is configured as a boost circuit.

20. The drive device according to claim 1, wherein the drive device is configured to be connected downstream of a rectifier structure that is connected downstream of the power adapter device for a power supply.

* * * * *